(12) United States Patent
Fulks et al.

(10) Patent No.: US 9,378,591 B2
(45) Date of Patent: Jun. 28, 2016

(54) METHOD AND APPARATUS FOR DETECTING OCCLUSION IN AN AUGMENTED REALITY DISPLAY

(71) Applicant: Nokia Technologies Oy, Espoo (FI)

(72) Inventors: Mark Fulks, Danville, CA (US); Aaron Licata, San Ramon, CA (US); Christophe Marle, San Francisco, CA (US); Srikanth Challa, San Jose, CA (US); Gabriel Nava-Vazquez, Campbell, CA (US); Timur Perelmutov, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/949,835

(22) Filed: Jul. 24, 2013

(65) Prior Publication Data

US 2014/0028715 A1 Jan. 30, 2014

Related U.S. Application Data

(60) Provisional application No. 61/676,636, filed on Jul. 27, 2012.

(51) Int. Cl.
*G06T 19/00* (2011.01)
*G06T 15/40* (2011.01)
*G06T 15/20* (2011.01)

(52) U.S. Cl.
CPC .............. *G06T 19/006* (2013.01); *G06T 15/40* (2013.01); *G06T 15/405* (2013.01); *G06T 15/20* (2013.01)

(58) Field of Classification Search
None
See application file for complete search history.

(56) References Cited

U.S. PATENT DOCUMENTS

| 5,898,437 | A | 4/1999 | Deolaliker |
| 6,111,582 | A * | 8/2000 | Jenkins ........................ 345/421 |
| 6,525,726 | B1 | 2/2003 | Xie et al. |
| 2006/0017722 | A1 * | 1/2006 | Hong et al. .................. 345/419 |
| 2008/0198158 | A1 | 8/2008 | Iwamura et al. |
| 2011/0279446 | A1 | 11/2011 | Castro et al. |
| 2012/0147005 | A1 | 6/2012 | Tsai et al. |

OTHER PUBLICATIONS

International Search Report and Written Opinion for Application No. PCT/FI2013/050773, dated Oct. 18, 2013.
Cohen-Or, D. et al., *A Survey of Visibility for Walkthrough Applications*, IEEE Transactions on Visualization and Computer Graphics, vol. 9, No. 3, pp. 412-431 [online][retrived Oct. 4, 2013] Retrieved from: <URL: http://dx.doi.org/10.1109/TVCG.2003.1207447>.

(Continued)

*Primary Examiner* — Jwalant Amin
(74) *Attorney, Agent, or Firm* — Alston & Bird LLP (57) ABSTRACT

A method, apparatus and computer program product are provided to display objects in an augmented reality interface. In this regard, the method, apparatus, and computer program product may determine a location of a mobile terminal, receive object meshes for one or more objects in geographic proximity to the mobile terminal, remove, using a processor, one or more polygons from the object meshes, and determine occlusion between the location of the mobile terminal and at least one point of interest. The at least one point of interest may be identified as occluded if a line segment between the location and the at least one point of interest intersects with at least one of the object meshes. The method, apparatus, and computer program product may also include causing the at least one point of interest to not be displayed by an augmented reality interface.

20 Claims, 8 Drawing Sheets

(56) References Cited

OTHER PUBLICATIONS

Haines, E. *Occlusion Culling Algorithms*, [online][retrieved Oct. 7, 2013] Retrieved from: <URL: http://www.gamasutra.com/view/feature/3394/occlusion_culling_algorithms.php>.

*Back-face Culling*, [online][retrieved Oct. 4, 2013] Retrieved from: <URL: http://en.wikipedia.org/w/index.php?title=Back-face_culling&oldid=439691083 >.

Extended European Search Report from corresponding European Patent Application No. 13822982.8 dated Feb. 8, 2016.

\* cited by examiner

METHOD AND APPARATUS FOR DETECTING OCCLUSION IN AN AUGMENTED REALITY DISPLAY

CROSS-REFERENCE TO RELATED APPLICATIONS

This application claims the benefit of and priority to U.S. Provisional Application No. 61/676,636, filed Jul. 27, 2012, herein incorporated by reference in its entirety.

TECHNOLOGICAL FIELD

An example embodiment of the present invention relates generally to augmented reality displays and, more particularly, to detecting occlusion of points of interest in an augmented reality display.

BACKGROUND

Advances in technology have allowed for increasingly complex features to be integrated into mobile terminals. Features such as video cameras, location information systems, compasses, gyroscopes, and accelerometers are capable of leveraging the communication capabilities of mobile terminals such as cellular phones, personal digital assistants (PDAs), and smartphones to provide users with unprecedented levels of information. One such way of providing information to a user is via the use of an augmented reality (AR) display. Such displays typically receive and display image data from an image capture device or a video capture device (e.g., a video camera coupled to the mobile terminal) and modify or overlay the image data to impart additional information to the user. For example, an AR display might use compass readings, an internal gyroscope, and an image of a night sky to overlay the night sky with the names of particular constellations. Another AR display might overlay a user's travel route to a destination over a view of a city street to direct the user.

One common use of augmented reality displays is to notify a user of nearby locations or other points of interest. For example, the world as viewed through an augmented reality display may annotate buildings, streets, or other locations with labels providing additional information about the annotated objects. These nearby points of interest may be identified as visible within the mobile terminal's field of view using a current location and/or facing of the mobile terminal, such as received via a compass and GPS receiver coupled to the device. However, in many environments, proximate locations may not be immediately visible to the user. For example, in an urban environment, buildings may be obscured by other buildings. As such, it is not appropriate to affix AR labels to obscured buildings, since such buildings are be visible in the display of the mobile terminal. Without a method for determining which points of interest are actually visible to the user, inaccurate, incorrect, or superfluous data may be provided to the user.

BRIEF SUMMARY

A method, apparatus and computer program product are therefore provided according to an example embodiment of the present invention in order to detect occlusion in an augmented reality display, such as by determining line of sight from a viewer position to one or more meshes for points of interest proximate to the user. In this regard, the method, apparatus and computer program product of an example embodiment may utilize a mobile terminal to determine a location of the terminal, to identify nearby meshes of occluding objects, to remove front facing triangles from the nearby meshes, to determine whether a direct line exists between a point of interest location and the mobile terminal without being obstructed by one of the meshes, and to cause points of interest represented by non-occluded points of interest to be displayed. By removing front-facing triangles from the meshes, these meshes may also represent the points of interest and a location associated with the building would otherwise be located within the mesh of the building (e.g., where points of interest are buildings or other objects that might obstruct a line of sight). Front facing triangles may be identified by determining a perpendicular vector to each triangle of the mesh, determining an angle between the perpendicular vector and the location of the viewer, and identifying a triangle with a determined angle of less than ninety degrees as a front facing triangle.

Building meshes may be received from a server and cached on the mobile terminal. The mobile terminal may dynamically determine occlusion based on the received messages as the location of the terminal changes. Such "on the fly" determination of occlusion may advantageously allow for real-time removal of occluded points of interest as the user changes location. This determination may be performed in parallel to generation of the AR display, such that points of interest may be removed as new mesh data is received from the server and occlusion is recalculated based on the new mesh data. Local processing of occlusion advantageously allows for accurate data to be presented on the display of the mobile terminal in real-time, as soon as the mesh data is received from the server and the occlusion detection operation is performed. By removing occluded points of interest from the AR display, display clutter is lowered and the user is more accurately provided with data describing points of interest that are actually visible to the user.

In some example embodiments, a method is provided that comprises determining a location of a mobile terminal, receiving object meshes for one or more objects in geographic proximity to the mobile terminal, removing, using a processor, one or more polygons from the object meshes, determining occlusion between the location of the mobile terminal and at least one point of interest, where the at least one point of interest is identified as occluded if a line segment between the location and the at least one point of interest intersects with at least one of the object meshes, and causing the occluded point of interest to not be displayed by an augmented reality interface. The occluded points of interest may initially be caused to be displayed in the augmented reality interface and be removed in response to a determination that the occluded point of interest is occluded. The object meshes may be received from a server in response to a determination of the location. The object meshes may be associated with a particular tile of map data received from the server. Front facing polygons may be identified in the object meshes by calculating a perpendicular vector for a plane defined by the polygon, and determining an angle between a viewing direction and the perpendicular vector. Where the determined angle is less than 90 degrees, the triangle may be determined to be a front facing polygon.

In some example embodiments, an apparatus is provided that comprises at least one processor and at least one memory including computer program instructions. The at least one memory and the computer program instructions may be configured to, with the at least one processor, cause the apparatus at least to determine a location, receive object meshes for one or more objects in geographic proximity to the location, remove one or more front facing polygons from the object meshes, determine occlusion between the location of the mobile terminal and at least one point of interest, where the at least one point of interest is identified as occluded if a line segment from the location and the at least one point of interest intersects with at least one of the object meshes, and cause the occluded point of interest to not be displayed by an augmented reality interface on a display device. The occluded points of interest may initially be displayed in the augmented reality interface and be removed in response to a determination that the occluded point of interest is occluded. The object meshes may be received from a server in response to a determination of the location of the mobile terminal. The object meshes may be associated with a particular tile of map data received from the server. Front facing polygons may be identified in the object meshes by calculating a perpendicular vector from a plane defined by a polygon, and determining an angle between a viewing direction and the perpendicular vector. Where the determined angle is less than 90 degrees, the polygons may be determined to be a front facing triangle.

Example embodiments may also include a computer program product comprising at least one non-transitory computer-readable storage medium bearing computer program instructions embodied therein for use with a computer, the computer program instructions comprising program instructions configured to determine a location of a mobile terminal, receive object meshes for one or more objects in geographic proximity to the mobile terminal, remove one or more front facing polygons from the object meshes, determine occlusion between the location of the mobile terminal and at least one point of interest, where the at least one point of interest is identified as occluded if a line segment from the location and the at least one point of interest intersects with at least one of the object meshes, and cause the occluded point of interest to not be displayed by an augmented reality interface. The occluded points of interest may initially be displayed in the augmented reality interface and be removed in response to a determination that the occluded point of interest is occluded. The object meshes may be received from a server in response to a determination of the location. The object meshes may be associated with a particular tile of map data received from the server. Front facing polygons may be identified in the object meshes by calculating a perpendicular vector for a plane defined by a polygon, and determining an angle between a viewing direction and the perpendicular vector. Where the determined angle is less than 90 degrees, the polygons may be determined to be a front facing polygons.

Yet further example embodiments describe an apparatus. The apparatus may include a processing means for determining a location of a mobile terminal, receiving object meshes for one or more objects in geographic proximity to the mobile terminal, removing one or more front facing polygons from the object meshes, determining occlusion between the location of the mobile terminal and at least one point of interest, where the at least one point of interest is identified as occluded if a line segment from the location and the at least one point of interest intersects with at least one of the object meshes, and causing the occluded point of interest to not be displayed by an augmented reality interface. The apparatus may further include a display means for causing display of the augmented reality interface.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to detect occlusion of objects in an AR interface, such as displayed via a display device coupled to a mobile terminal. In this regard, a method, apparatus and computer program product of an example embodiment may receive one or more meshes for potentially occluding objects in a particular area. Front facing triangles may be removed from the meshes, and a determination may be performed as to whether a direct line-of-sight exists between a particular point of interest and a viewer. Individual triangles of the mesh may be analyzed to determine whether each triangle is a forward facing triangle. For example, a triangle may be determined to be forward facing if an angle between the triangle's perpendicular vector and a viewing direction of a viewer is less than 90 degrees. Removal of such triangles allows for object occlusion determinations that remove the risk of an object erroneously occluding itself.

The system of an embodiment of the present invention may include an apparatus 100 as generally described below in conjunction with FIG. 1 for performing one or more of the operations set forth by FIGS. 2-8 and also described below. The apparatus will be described in terms of a mobile terminal for the purposes of example, but the apparatus 100 may also be embodied in another type of computing device, either mobile or fixed, such as a computer workstation, a personal computer, a laptop, a cellular phone, or a smart phone. In this embodiment, the mobile terminal may be in communication with a display and/or a data network, either directly, such as via a wireless or wireline connection, or indirectly via one or more intermediate computing devices. In this regard, the display and the mobile terminal may be parts of the same system in some embodiments. However, the apparatus 100 may alternatively be embodied by another computing device that is in communication with the display and the mobile terminal, such as via a wireless connection, a wireline connection or the like. For example, the apparatus may be a mobile telephone, a personal digital assistant (PDA), a pager, a laptop computer, a tablet computer or any of numerous other hand held or portable communication devices, computation devices, content generation devices, content consumption devices or combinations thereof.

Figure 1:
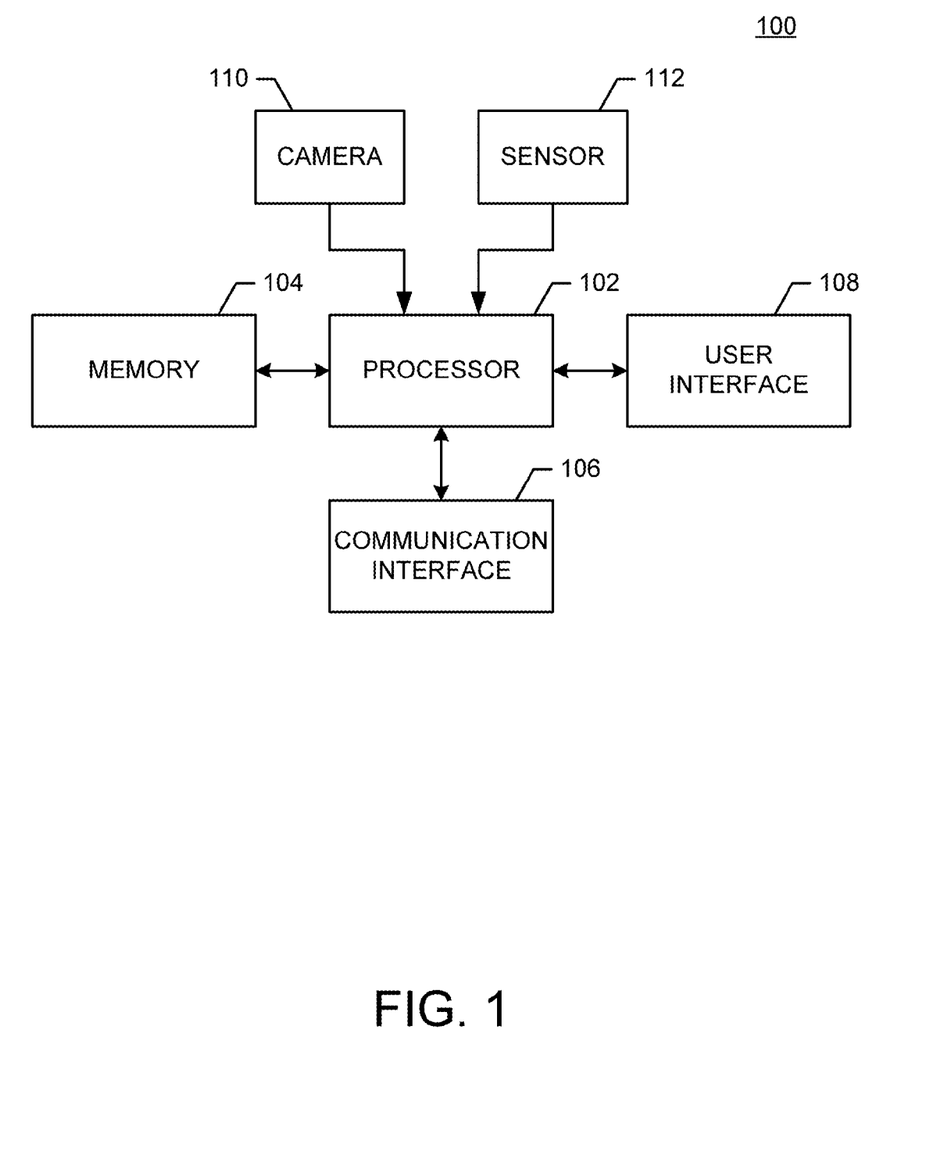
FIG. 1 is a block diagram of an apparatus that may be specifically configured in accordance with an example embodiment of the present invention.

It should also be noted that while FIG. 1 illustrates one example of a configuration of an apparatus 100 for generating an AR interface, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, the apparatus 100 for determining object occlusion in an AR interface in accordance with example embodiments may include or otherwise be in communication with one or more of a processor 102, a memory 104, a communication interface 106, a user interface 108, a camera 110 and a sensor 112. In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

In some embodiments, the apparatus 100 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory device 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 106 may be any means such as a device or circuitry embodied in either hardware or a combination of hardware and software that is configured to receive and/or transmit data from/to a network and/or any other device or module in communication with the apparatus 100, such as by supporting communications with a display and/or a mobile terminal. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 100 may include a user interface 108 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. In one embodiment, the display of the apparatus may be embodied by a liquid crystal display (LCD) screen presented on one surface of the mobile terminal. For example, in an instance in which the display is an LCD screen embodied on one surface of the mobile terminal, the AR interface may be displayed on the screen for viewing by and interacting with the user of the mobile terminal. As the mobile terminal moves in physical space, the AR interface displayed on the screen may update as visual input to the mobile terminal changes. The processor 102 may comprise user interface circuitry configured to control at least some functions of one or more user interface elements such as a display and, in some embodiments, a speaker, ringer, microphone and/or the like. The processor 102 and/or user interface circuitry comprising the processor 102 may be configured to control one or more functions of one or more user interface elements through computer program instructions (e.g., software and/or firmware) stored on a memory accessible to the processor (e.g., memory 104, and/or the like).

In some example embodiments, the apparatus 100 may include an image capturing element, such as a camera 110, video and/or audio module, in communication with the processor 102. The image capturing element may be any means for capturing an image, video and/or audio for storage, display or transmission. For example, in an example embodiment in which the image capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image. Alternatively, the camera may include only the hardware needed to view an image, while a memory device 104 of the apparatus stores instructions for execution by the processor in the form of software necessary to create a digital image file from a captured image. In an example embodiment, the camera 110 may further include a processing element such as a co-processor which assists the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

As shown in FIG. 1, the apparatus 100 may also include one or more sensors 112, such as a location information receiver (e.g., a GPS receiver), an accelerometer, a gyroscope, a compass, or the like, that may be in communication with the processor 102 and may be configured to determine the location of the apparatus and to detect changes in motion and/or orientation of the apparatus.

The method, apparatus 100 and computer program product may now be described in conjunction with the operations illustrated in FIGS. 2-8. In this regard, the apparatus may include means, such as the processor 102, the camera 110 or the like, for generating an AR interface. See FIG. 6. The AR interface may be generated in various manners. In some embodiments, the processor 102 may include and/or may execute an overlay manager to receive data about an environment and to determine one or more overlay elements corresponding to the environment. The processor 102 may determine one or more meshes proximate to the apparatus 100, remove front facing polygons (e.g., front facing triangles) from the proximate meshes, and perform occlusion detection operations between a location of a viewer and the one or more proximate meshes. In some embodiments, the processor 102 may cause one or more of the above processes to be performed by a graphics processor coupled to the processor 102. Although the processor 102 is described as a single element, the processor 102 may also be implemented as one or more applications executing on one or more processors including, for example, a graphics processor, in communication with one another.

Figure 2:
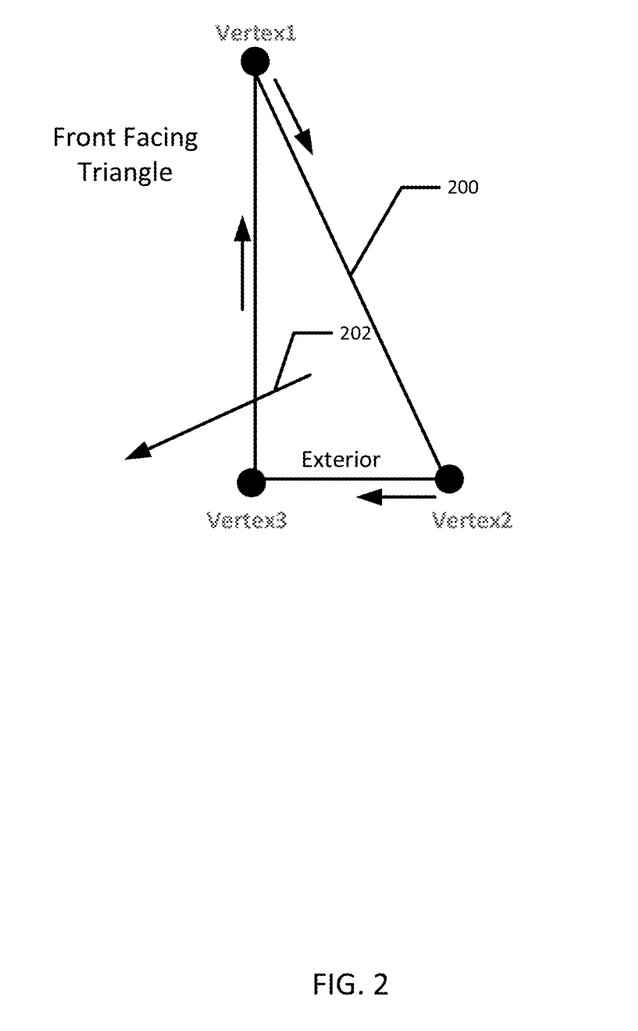
FIG. 2 is a schematic diagram of an example triangle that may be employed as part of a three dimensional mesh in accordance with an example embodiment of the present invention.

FIG. 2 is a schematic diagram of an example triangle 200 that may be employed as part of a three dimensional mesh in accordance with an example embodiment of the present invention. Triangles, such as the example triangle 200, are frequently used to define meshes in three dimensional graphics programming, and thus example embodiments are provided that describe implementations of embodiments of the invention using triangles as the polygons to be analyzed to determine which shapes are front facing and should be removed from an example mesh. However, other polygons could also be utilized instead of triangles. For example, embodiments of the invention might function using other polygons, planes, spline curves, or the like instead of or in addition to triangles. The triangle 200 may be defined by three vertices by coordinates in a three dimensional space (e.g., (x,y,z)). The order in which the coordinates are presented (e.g., clockwise vs. counterclockwise) may determine the facing of the triangle. For example, a forward facing triangle (e.g., exterior face towards the user) may have vertices presented in a clockwise manner, and a rear facing triangle (e.g., exterior face away from the user) may have vertices presented in a counterclockwise manner. A direction of a perpendicular vector may be defined for the triangle from the order in which the vertices are presented. Since the perpendicular vector projects from the exterior face of the triangle, the definition of the interior and exterior faces also defines the direction of the perpendicular vector.

For example, the example triangle 200 features three vertices, vertex1, vertex2, and vertex3. The example triangle 200 is defined by three line segments starting at vertex1, then to vertex2, then to vertex3, and finally back to vertex1. These vertices are presented in a clockwise manner, and thus the example triangle is a forward facing triangle. In such a case, the perpendicular vector may be defined as projecting out of the exterior of the triangle formed by the three vertices (e.g., towards the viewer, in the instant example) such that the vector projects at a right angle to the exterior face of the triangle. If the order of the vertices were reversed (e.g., the same vertices, but defined in a counter-clockwise manner), then the perpendicular vector 202 would project in the opposite direction (e.g., away from the viewer in the instant example), as the exterior face of the triangle would be reversed.

Figure 3:
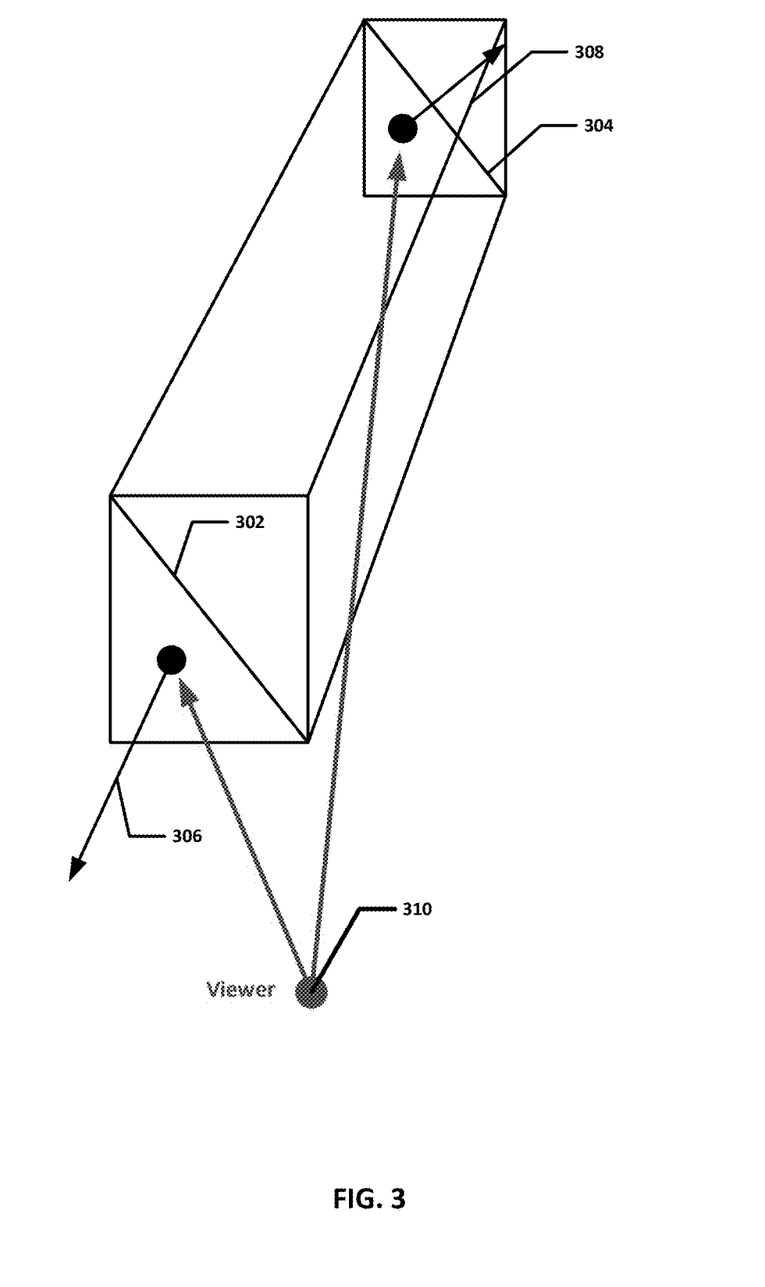
FIG. 3 is a schematic diagram illustrating examples of forward and rear facing triangles and vectors that are perpendicular to the example triangles in accordance with an example embodiment of the present invention.

FIG. 3 is a schematic diagram illustrating examples of a forward facing triangle 302 and a rear facing triangle 304 and vectors 306, 308 that are perpendicular to the example triangles in accordance with an example embodiment of the present invention. The forward facing triangle 302 and the rear facing triangle 304 may be defined by three vertices as described above with respect to FIG. 2. Each of the triangles 302, 304 has a corresponding perpendicular vector 306, 308. In the present example, the forward facing triangle 302 has a perpendicular vector 306 that is directed towards a viewer 310, whereas the rear facing triangle 304 has a perpendicular vector 308 that is directed away from the viewer 310. The angle between the perpendicular vectors 306, 308 and the viewer 310 may be utilized to determine whether a particular triangle is facing towards the user or away from the user. The process for determining whether a face of a particular triangle is facing towards the user is described further below with respect to FIG. 4.

Figure 4:
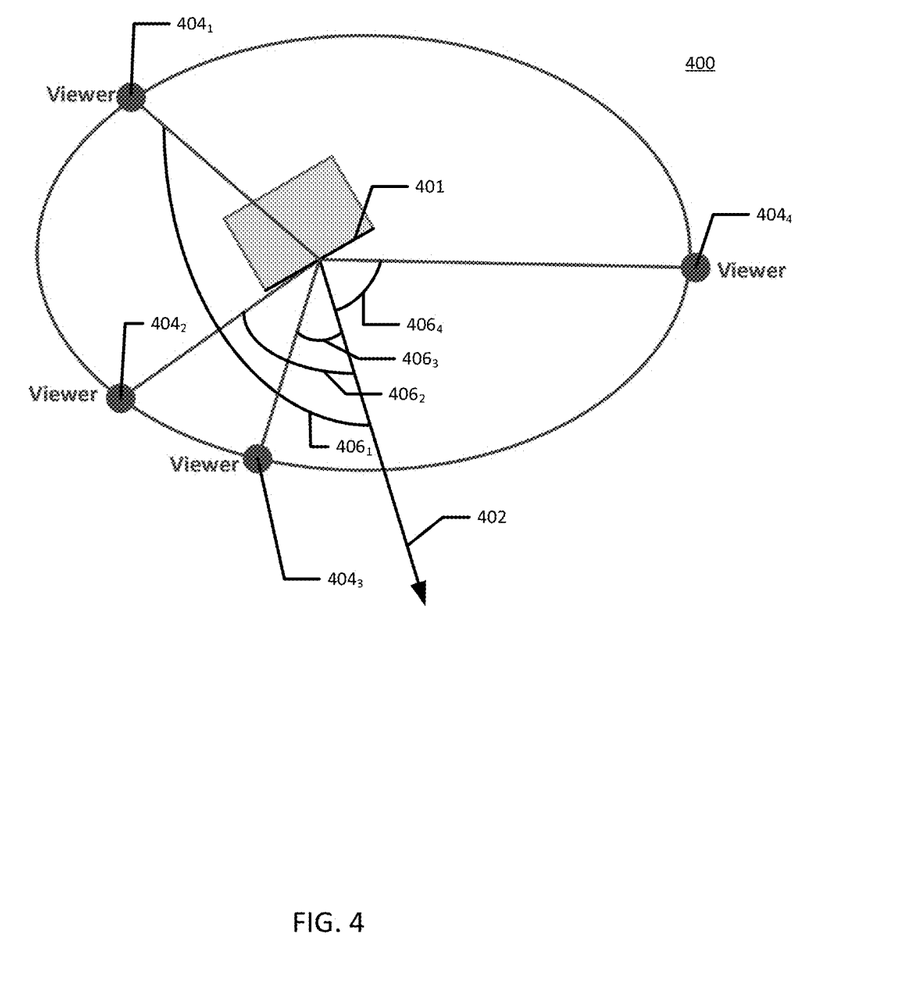
FIG. 4 is a schematic diagram illustrating an example of a process for determining whether a triangle is forward facing using a viewer's location and perpendicular vector to an example triangle in accordance with an example embodiment of the present invention.

FIG. 4 is a schematic diagram illustrating an example of a process 400 for determining whether a triangle is forward facing using a viewer's location and perpendicular vector to an example triangle in accordance with an example embodiment of the present invention. The process 400 is a two dimensional projection of a polygon and a viewer at several different positions relative to the polygon. The present example focuses on one side 401 of the polygon, and whether or not that side of the polygon is defined as facing toward (e.g., forward facing) or away (e.g., rear facing) the user at each viewing location. The side 401 may be a triangle as described above with respect to FIGS. 2 and 3. In the present example, the side 401 has a perpendicular vector 402 projecting out from the exterior of the side 401. As described above, the perpendicular vector may be defined as a vector that is perpendicular to the exterior side of the polygon, in this case, the side 401.

To determine whether the front of the side 401 is visible to the viewer, an angle may be determined between the viewing direction and the perpendicular vector 402. The viewing direction may be defined as a vector from the viewer to the perpendicular vector. The process 400 depicts a series of angles $406_1$, $406_2$, $406_3$, and $406_4$ between the perpendicular vector 402 and a viewing direction at four different positions $404_1$, $404_2$, $404_3$, $404_4$. Where the angle 406 is less than 90 degrees (e.g., an acute angle), the front of the side 401 is visible. Where the angle 406 is greater than 90 degrees (e.g., an obtuse angle), the back of the side 401 is visible. In the instant example, the angles $406_1$ and $406_2$ for viewing positions $404_1$ and $404_2$, respectively, are greater than 90 degrees; therefore the front of side 401 would not be visible from the viewing positions $404_1$ or $404_2$. The angles $406_3$ and $406_4$ for viewing positions $404_3$ and $404_4$, respectively, are less than 90 degrees; therefore the front of side 401 would be visible for viewing positions $404_3$ and $404_4$. Although the instant example is described with respect to angles in two dimensions for the sake of simplicity, the same techniques also apply in three dimensions. Once the front facing triangles are identified based on the position of the viewer, those triangles may be removed from the mesh to enable proper occlusion detection for points of interest. An example of front facing triangles being removed from an example mesh is described further below with respect to FIG. 5.

Figure 5:
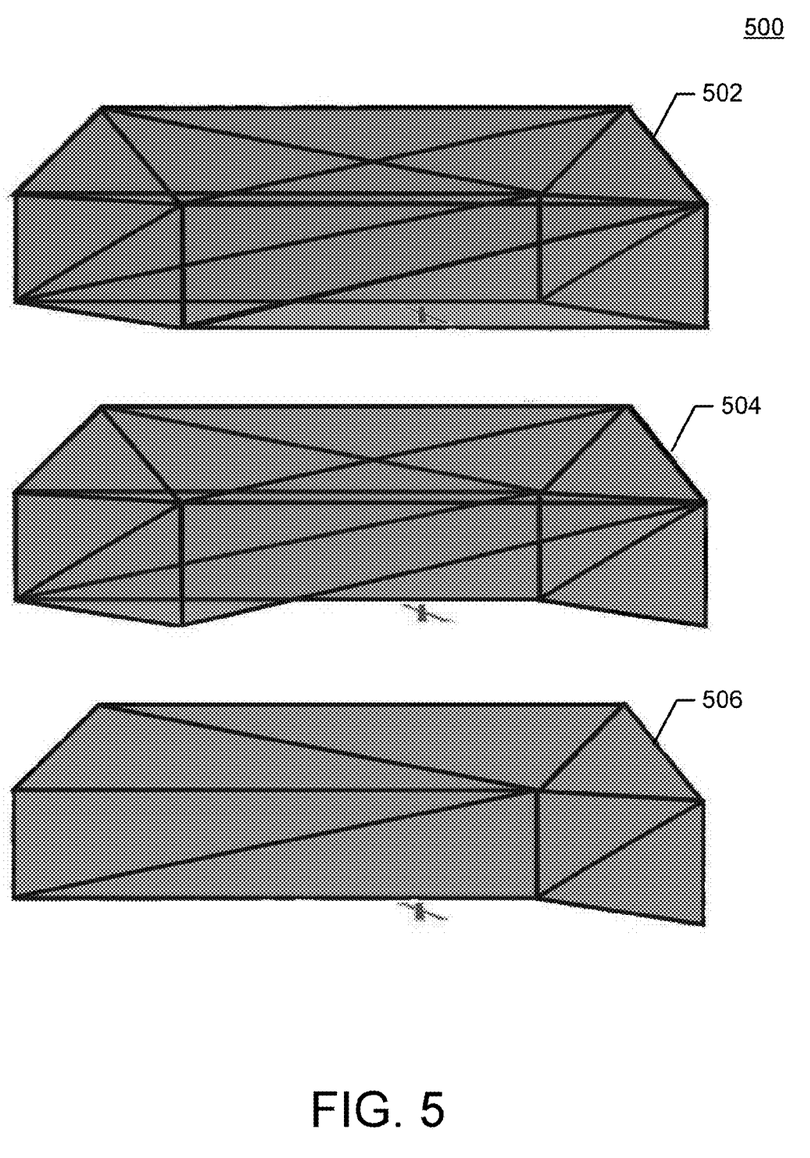
FIG. 5 is a schematic diagram depicting an example of a process for removing forward facing triangles from an example mesh in accordance with an example embodiment of the present invention.

FIG. 5 is a schematic diagram depicting an example of a process 500 for removing forward facing triangles from a mesh 502 in accordance with an example embodiment of the present invention. The top mesh 502 is a representation of an object, such as a building, in three dimensions. The mesh may be defined by a series of vertices and edges. These vertices and edges may be used to represent the mesh as a series of triangles as described with respect to FIGS. 2-4. The front triangles of the top mesh obscure a point located in the center of the mesh. In the context of an AR interface, this center point may represent a geographic location of a point of interest associated with the building for which the mesh is constructed. If occlusion detection were performed on the building in which the point of interest is located, a line from the point of interest to the viewer would always be occluded because the front wall of the building obscures the geographic location. As such, if occlusion detection were performed, the building would never be labeled in the AR interface. Therefore, it may be appropriate to remove front facing triangles from the mesh so that triangles that are a part of the mesh associated with the building do not interfere with occlusion calculations for points of interest contained within the building.

Each of the triangles that compose the top mesh 502 may be analyzed to determine if the triangle is facing towards the user, such as by a process as described above with respect to FIG. 4, or below with respect to FIG. 8. As triangles are determined to be front facing, they may be removed from the mesh. The middle mesh 504 depicts the top mesh 502 with one of the front facing triangles removed. The bottom mesh 506 depicts the top mesh 502 with all forward facing triangles removed. After the forward facing triangles are removed, occlusion detection may be performed using the mesh 506 without obscuring the geographic location of a point of interest associated with the mesh, while also retaining the ability to occlude points of interest that may be located behind the mesh 506.

Figure 6:
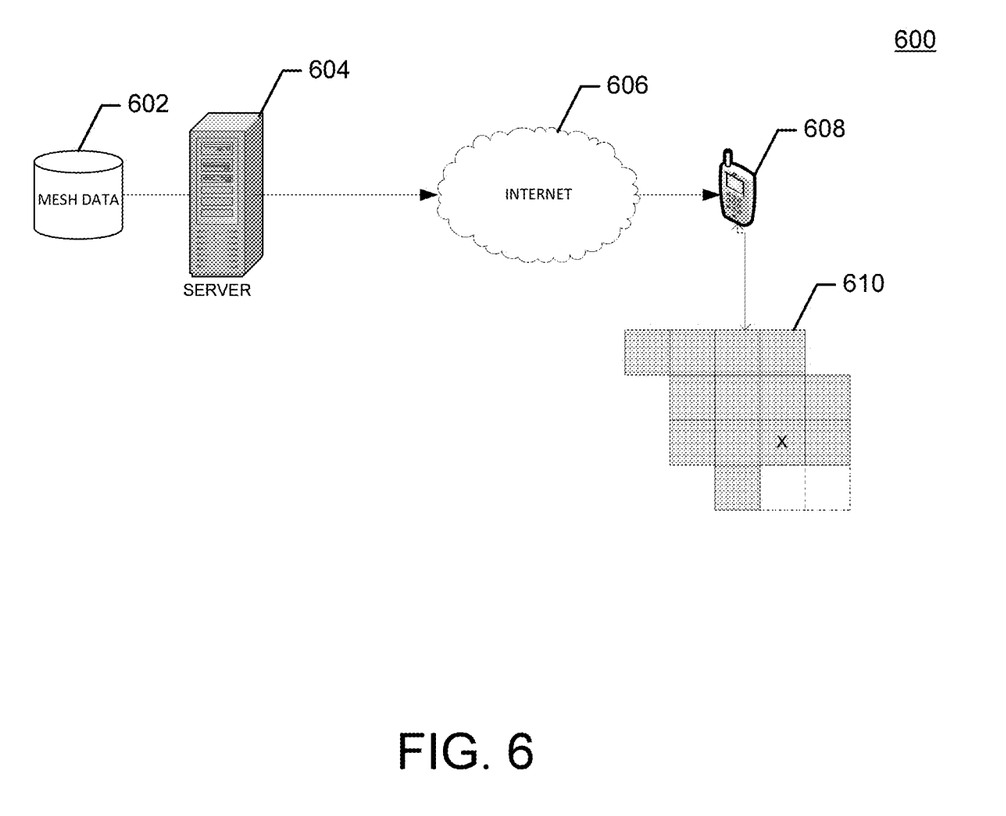
FIG. 6 is a block diagram depicting an example of a process for receiving mesh data from a server or other network entity in accordance with an example embodiment of the present invention.

FIG. 6 is a block diagram depicting an example of a process 600 for receiving mesh data from a server in accordance with an example embodiment of the present invention. In the example embodiment, a network entity, such as a server 604, may have access to a set of mesh data 602, and the mesh data 602 may define a set of meshes for a particular geographic region. For example, a geographic area may be separated into a series of tiles, and a given set of meshes may be associated with a particular tile. The mesh data 602 may be stored on the server 604, in a database separate from the server 604, on a network accessible to the server 604, or via any other mechanism whereby the mesh data is accessible to the server. In some embodiments, the server 604 may be a plurality of computing devices, such as part of a cloud computing platform. The server 604 may be in communication with a mobile terminal 608 via a network 606. The network 606 may be a network as described above with respect to FIG. 1, and the mobile terminal 608 may communicate with the server 604 by any communication method including wired or wireless transmissions, cellular signals, or the like. In some embodiments, the network 606 may include the Internet.

The mobile terminal 608 may include an apparatus such as the apparatus 100 described above with respect to FIG. 1. The mobile terminal 608 may transmit location data to the server 604 and receive mesh data for tiles corresponding to the location data. For example, the mobile terminal 608 may transmit a current location "X" to the server and receive a set of map tile data 610 corresponding to the current location. Alternately, the mobile terminal 608 may request data for particular map tiles, adjacent map tiles, or any other method of identifying optimal tiles to provide data about the location or likely location of the mobile terminal. Each of the tiles 610 may contain mesh data associated with structures or other objects present at the geographic location associated with the tile. In some aspects, the tile data may also include point of interest data or other data to be displayed in an AR interface on the mobile terminal 608. The mesh data received from the server 604 in this manner may be used to perform occlusion detection as described above with respect to FIGS. 2-5 and below with respect to FIGS. 7-8. In some aspects, occlusion data is updated by the mobile terminal 608 as the mesh data is received from the server 604, enabling the mobile terminal to add or remove elements from the AR interface as the terminal 608 receives updated mesh data. Mesh data may be deleted from storage in local memory as the mobile terminal changes location. For example, mesh data may store data (e.g., in a local cache) according to a most distance replacement scheme. Tiles proximate to the mobile terminal may be downloaded asynchronously as the mobile terminal moves.

Figure 7:
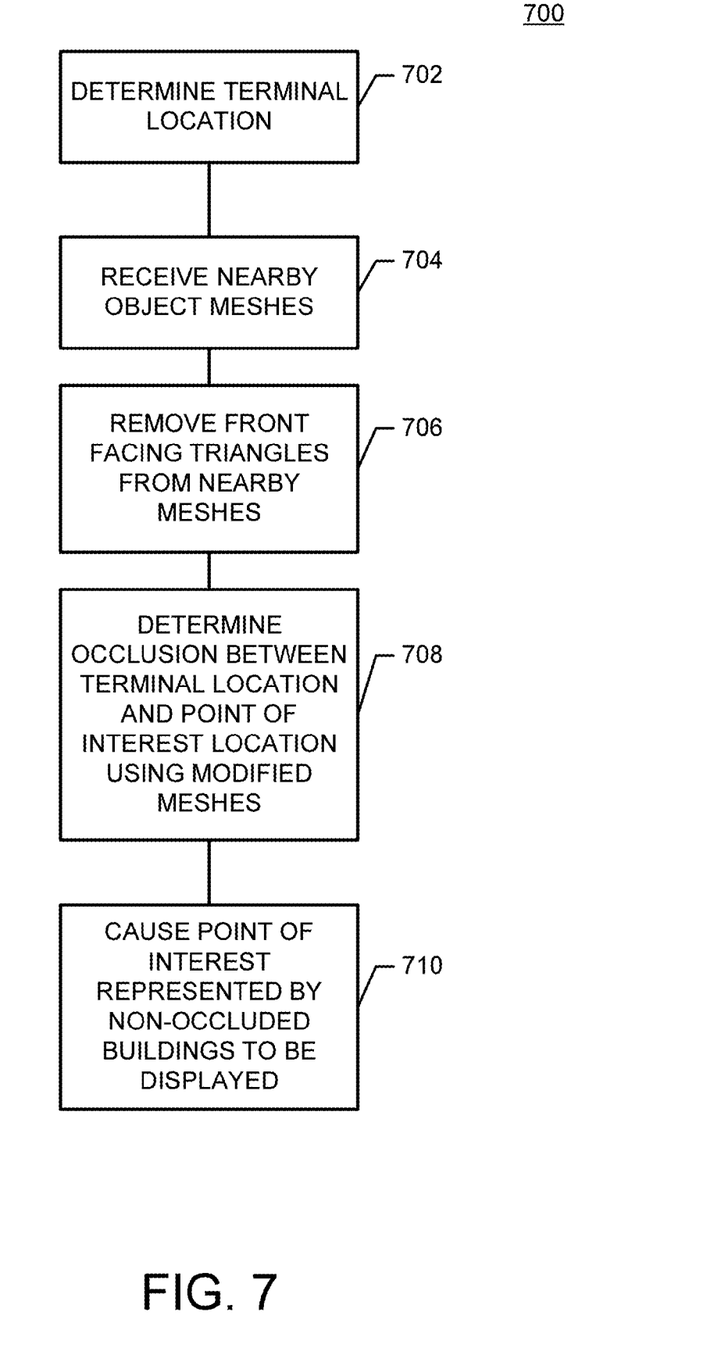
FIG. 7 is a flow diagram depicting an example of a method for detecting occlusion in an augmented reality display in accordance with an example embodiment of the present invention.

FIG. 7 is a flow diagram depicting an example of a method 700 for detecting occlusion in an augmented reality display in accordance with an example embodiment of the present invention. The method 700 is operable to detect occlusion of points of interest in an AR interface, and to remove occluded points of interest from the AR interface. Aspects of the method 700 may include receiving information related to one or more objects in a geographic area, modifying one or more meshes corresponding to the one or more objects by removing front facing triangles from the meshes, and performing occlusion calculations between a user and one or more points of interest using the modified meshes. As described above, elements of the method 700 may be performed by an apparatus, such as the apparatus 100 described with respect to FIG. 1. In some embodiments of the invention, the method 700 may be performed a processing means, such as the processor 102 described with respect to FIG. 1.

At action 702, a location of a mobile terminal is determined. As described above with respect to FIGS. 1 and 6, a mobile terminal may receive location information from one or more sensors, such as a GPS receiver, a compass, one or more accelerometers, a gyroscope, or the like. The location of the mobile terminal may be determined by an apparatus, such as the apparatus 100 described with respect to FIG. 1, such as by the processor 102. For example, a processing means such as the processor 102 may use the sensor data to determine the latitude and longitude coordinates of the mobile terminal, or the processor 102 may receive the latitude and longitude from the sensor itself.

At action 704, meshes corresponding to nearby objects are received. As described above with respect to FIG. 6, the meshes may be associated with the location of the mobile terminal. The mobile terminal may request a set of meshes for nearby locations from a server by transmitting the location of the mobile terminal to the server. As described with respect to FIG. 6, mesh data may be transmitted as a set of map tile data. In some embodiments, the map tile data may be transmitted to the mobile terminal in an asynchronous or streaming manner, and the method 700 may execute to update an AR interface as tile data is received. The received meshes may define various occluding objects associated with map data received by the mobile terminal. For example, meshes may define buildings, trees, signs, bridges, changes in elevation, or any other object that may obstruct a user's view of a point of interest. In some embodiments, the objects are associated with particular points of interest. For example, a building may be associated with a business located within the building. The meshes may be constructed as described above with respect to FIGS. 2-4, using a set of vertex data to generate three dimensional primitives, such as triangles. The action 704 of receiving the object meshes may be performed by an apparatus, such as the apparatus 100 described with respect to FIG. 1, such as the processor 102 or the communication interface 106. In this regard, the apparatus may include means, such as the processor, the communication interface or the like, for receiving the mesh data via a network connection or by accessing data stored in memory on the mobile terminal, such as in a cache.

At action 706, front facing triangles may be removed from the object meshes. As described above with respect to FIGS. 2-5, removal of front facing triangles allows for a mesh to be analyzed for occlusion purposes without occluding points of interest located within the mesh (e.g., a building location obscured by walls of the building). An example of a method 800 for removing front facing triangles from a particular mesh using the techniques described above with respect to FIGS. 2-5 is described further below with respect to FIG. 8. The front facing triangles may be removed by an apparatus, such as the apparatus 100 described with respect to FIG. 1 which may include a processing means such as the processor 102 for removing the front facing triangles.

At action 708, occlusion is determined between a terminal location (e.g., a viewer's location) and a point of interest location using the modified meshes generated at action 708. The existence of occlusion may be determined using a line-to-polygon intersection algorithm. For example, a straight line segment may be drawn between a location of the mobile terminal and a point of interest. If the straight line segment intersects any polygon of a mesh, then the point of interest may be determined as occluded by the mesh. The occlusion detection process may be performed by an apparatus, such as an apparatus 100 described with respect to FIG. 1 which may include a processing means such as the processor 102 for determining an occlusion.

At action 710, points of interest may be displayed in accordance with the occlusion determinations performed at action 708. For example, the AR interface may only display point of interest data for points of interest that are not occluded. In some embodiments, the AR interface may display all points of interest, and remove occluded points of interest as they are determined to be occluded. In this manner, points of interest may be displayed to the user immediately in circumstances where mesh data has not been received from a server or occlusion calculations have not yet been performed. In this manner, the mobile terminal may still perform occlusion detection while also still providing the user relevant data in real-time. The points of interest may be caused to display on a display means, such as a display device coupled to a mobile terminal displaying an AR interface. The points of interest may be caused to display via an apparatus, such as the apparatus 100 described with respect to FIG. 1 which may include a processing means such as the processor 102 for causing the display of the points of interest.

Figure 8:
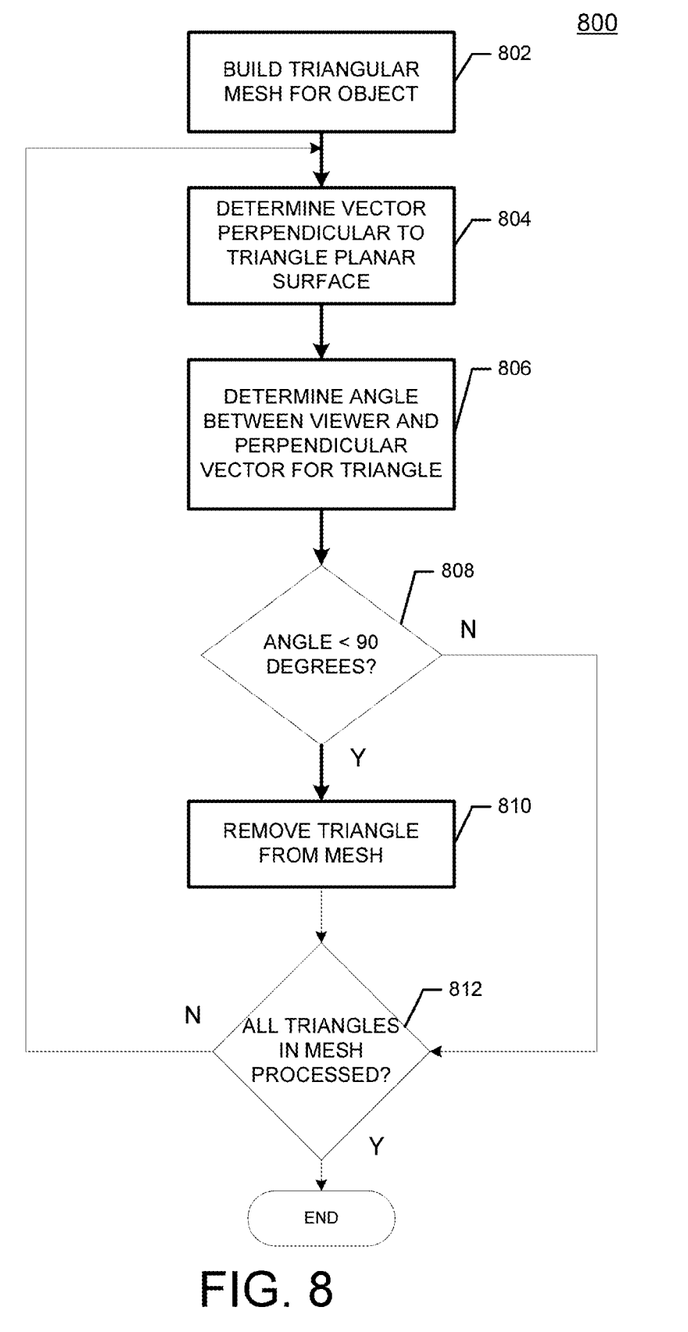
FIG. 8 is a flow diagram depicting an example of a method for detecting forward facing triangles in accordance with an example embodiment of the present invention.

FIG. 8 is a flow diagram depicting an example of a method 800 for detecting front facing triangles in accordance with an example embodiment of the present invention. As described above with respect to FIGS. 2-5 and 7, removal of front facing triangles from object meshes allows for the meshes to be used for occlusion detection operations while ensuring points of interest inside of the meshes to not be improperly occluded. The method 800 is operable to analyze one or more triangles of a particular object mesh, and to determine whether the analyzed triangle is forward facing relative to a viewer's position. The method 800 may be performed by an apparatus, such as the apparatus 100 described with respect to FIG. 1 which may include a processing means, such as the processor 102 for detecting front facing triangles.

At action 802, a triangular mesh for a building is constructed. In some embodiments, triangular meshes are received as a set of vertex coordinates in a three dimensional space. These vertex coordinates may be used to create a mesh of triangles suitable for rendering in a three dimensional environment. The vertex coordinates may be determined relative to a building's geographic location, such as a geographic coordinate. In some aspects, meshes may be received as triangles directly, eliminating the need to build the mesh from the vertex point. The meshes may be constructed by an apparatus, such as the apparatus 100 described with respect to FIG. 1, and, more particularly, by a processing means, such as the processor 102.

At action 804, a perpendicular vector for a triangle planar surface is determined. As described above with respect to FIGS. 2-4, the perpendicular vector may be a vector that projects out of the exterior face of the triangle and which is perpendicular to the plane of the exterior face of the triangle. For example, the perpendicular vector may be determined by calculation of the normal vector of a plane defined by the vertices of the triangle, such that the plane of the triangle is defined by an equation:

$$f(x,y,z)=ax+by+cz+d=0 \qquad \text{(Eq. 1)}$$

And the normal vector is defined by an equation:

$$N = \nabla f = \begin{bmatrix} a \\ b \\ c \end{bmatrix}. \qquad \text{(Eq. 2)}$$

Where x, y, and z are locations in a three dimensional coordinate system, a, b, and c are coefficients that define the orientation of the plane, and $\nabla f$ denotes the gradient at any arbitrary plane location.

The perpendicular vector for the triangle may be determined by an apparatus, such as the apparatus 100 described with respect to FIG. 1, and, more particularly, by a processing means, such as the processor 102.

At action 806, an angle between a viewing direction (e.g., a vector from the viewer to an arbitrary vertex of the triangle) and the perpendicular vector for the triangle is determined. As described above with respect to FIGS. 2-4, the angle may be determined according to known methods, such as taking the arccosine of the dot product of the two vectors. The angle may be determined by, for example, an apparatus such as the apparatus 100 described with respect to FIG. 1. In one embodiment, the apparatus may include a processing means such as the processor 102 for determining the angle.

At action 808, the method 800 branches depending upon whether the angle determined at action 806 is less than 90 degrees. An angle of less than 90 degrees is indicative of a forward facing triangle. As such, the triangle would be removed at action 810 if the angle was less than 90 degrees. If the angle is not less than 90 degrees, then the method 800 may proceed to action 812 to continue processing of the other triangles of the mesh. The determination as to how to proceed based on the angle may be performed by an apparatus, such as the apparatus 100 described with respect to FIG. 100, and, more particularly, by a processing means such as the processor 102.

At action 810, if the angle is less than 90 degrees, the triangle may be removed from the mesh, as described above with respect to FIG. 5. The triangle may be removed from the mesh by an apparatus, such as the apparatus 100 described with respect to FIG. 1 which may include a processing means such as the processor 102 for removing the triangle from the mesh.

At action 812, the method 800 performs a determination as to whether processing for the mesh is complete. If the method 800 has processed all triangles in the mesh, the method ends with respect to that particular mesh. Otherwise, the method 800 may return to action 804 to continue processing of other triangles. Although the instant example method describes analyzing each triangle in a mesh, embodiments may analyze a subset of all triangles, such as by breaking a mesh up for parallel processing or by only analyzing triangles that are associated with certain coordinates or vertices of the mesh (e.g., only processing triangles that appear to be closest to the user). After processing for the mesh is complete, the method 800 ends, although processing may continue to analyze other meshes and/or determine occlusion for the newly modified meshes. The determination as to whether to continue processing may be performed by an apparatus, such as the apparatus 100 described with respect to FIG. 1, and, more particularly, by a processing means such as the processor 102.

It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method comprising:
   determining a location of a mobile terminal;
   receiving one or more object meshes for one or more objects in geographic proximity to the mobile terminal;
   removing, using a processor, one or more unoccluded front facing polygons from the one or more object meshes;
   determining occlusion between the location of the mobile terminal and at least one point of interest after removing the one or more unoccluded front facing polygons, where the at least one point of interest is identified as occluded if a line segment between the location and the at least one point of interest intersects with at least one of the one or more object meshes; and
   causing the at least one point of interest to not be displayed by an augmented reality interface.

2. The method of claim 1, further comprising:
   causing the displaying of the at least one point of interest in the augmented reality interface; and
   removing the at least one point of interest in response to a determination that the at least one point of interest is occluded.

3. The method of claim 1, wherein the one or more object meshes are received from a server in response to a determination of the location.

4. The method of claim 1, wherein the one or more object meshes are associated with a particular tile of map data received from the server.

5. The method of claim 1, further comprising identifying the one or more unoccluded front facing polygons in the one or more object meshes by:
   calculating a perpendicular vector for a plane defined by at least one polygon associated with the one or more object meshes; and
   determining an angle between a viewing direction and the perpendicular vector.

6. The method of claim 5, further comprising identifying the at least one polygon as an unoccluded front facing polygon in response to the determined angle being less than 90 degrees.

7. The method of claim 5, wherein the at least one polygon is a triangle.

8. An apparatus comprising:
   at least one processor; and
   at least one memory including computer program code,
   the at least one memory and the computer program code configured to, with the at least one processor, cause the apparatus to perform at least the following:
   cause the apparatus at least to determine a location of a mobile terminal;
   receive one or more object meshes for one or more objects in geographic proximity to the location;
   remove one or more unoccluded front facing polygons from the one or more object meshes;
   determine occlusion between the location of the mobile terminal and at least one point of interest after removing the one or more unoccluded front facing polygons, wherein the at least one point of interest is identified as occluded if a line segment from the location and the at least one point of interest intersects with at least one of the object meshes;
   and cause the occluded point of interest to not be displayed by an augmented reality interface on a display device.

9. The apparatus of claim 8, wherein the apparatus is further configured to:
   cause display of the at least one point of interest in the augmented reality interface; and
   remove the at least one point of interest in response to a determination that the at least one point of interest is occluded.

10. The apparatus of claim 8, wherein the one or more object meshes are received from a server in response to a determination of the location.

11. The apparatus of claim 8, wherein the one or more object meshes are associated with a particular tile of map data received from the server.

12. The apparatus of claim 8, wherein the apparatus is further configured to identify the one or more unoccluded front facing polygons in the one or more object meshes by:
   calculating a perpendicular vector for a plane defined by at least one polygon associated with the one or more object meshes; and
   determining an angle between a viewing direction and the perpendicular vector.

13. The apparatus of claim 12, wherein the apparatus is further configured to identify the at least one polygon as an unoccluded front facing polygon in response to the determined angle being less than 90 degrees.

14. The apparatus of claim 12, wherein the at least one polygon is a triangle.

15. A computer program product comprising a non-transitory computer-readable memory having a computer program stored therein, the computer program comprising code configured to:
   cause an apparatus at least to determine a location of a mobile terminal;
   receive one or more object meshes for one or more objects in geographic proximity to the location;
   remove one or more unoccluded front facing polygons from the one or more object meshes;
   determine occlusion between the location of the mobile terminal and at least one point of interest after removing the one or more unoccluded front facing polygons, wherein the at least one point of interest is identified as occluded if a line segment from the location and the at least one point of interest intersects with at least one of the object meshes;

and cause the occluded point of interest to not be displayed by an augmented reality interface on a display device.

16. The computer program product of claim 15, further comprising code configured to:

cause display of the at least one point of interest in the augmented reality interface; and remove the at least one point of interest in response to a determination that the at least one point of interest is occluded.

17. The computer program product of claim 15, wherein the one or more object meshes are received from a server in response to a determination of the location.

18. The computer program product of claim 15, wherein the one or more object meshes are associated with a particular tile of map data received from the server.

19. The computer program product of claim 18, further comprising code configured to identify the one or more unoccluded front facing polygons in the one or more object meshes by:

calculating a perpendicular vector for a plane defined by at least one polygon associated with the one or more object meshes; and determining an angle between a viewing direction and the perpendicular vector.

20. The computer program product of claim 18, wherein the apparatus is further configured to identify the at least one polygon as an unoccluded front facing polygon in response to the determined angle being less than 90 degrees.

* * * * *